United States Patent [19]

Hames

[11] Patent Number: 5,295,648

[45] Date of Patent: Mar. 22, 1994

[54] ADJUSTABLE COMPUTER SYSTEM STAND

[75] Inventor: Edward L. Hames, Peterborough, N.H.

[73] Assignees: Curtis Manufacturing Company, Inc., Jaffrey, N.H.;

[21] Appl. No.: 949,398

[22] Filed: Sep. 22, 1992

[51] Int. Cl.⁵ .............................................. A47G 23/02
[52] U.S. Cl. ..................................... 248/149; 248/924
[58] Field of Search ............... 248/149, 146, 917, 919, 248/920, 924, 346; 211/23, 24, 43

[56] References Cited

U.S. PATENT DOCUMENTS

| D. 287,365 | 12/1986 | Judd | D14/114 |
|---|---|---|---|
| 2,230,511 | 2/1941 | Luttrup | 248/149 UX |
| 3,094,258 | 6/1963 | Punke | 248/346 X |
| 3,904,158 | 9/1975 | Michael | 248/149 X |
| 4,118,002 | 10/1978 | Bartlett | 248/149 X |
| 4,738,425 | 4/1988 | Foster | 248/346 |
| 4,856,659 | 8/1989 | Krebs | 211/23 X |

OTHER PUBLICATIONS

Curtis Manufacturing Company Inc.'s 1991 Product Brochure—Published in Jaffrey, New Hampshire.

Primary Examiner—Ramon O. Ramirez
Attorney, Agent, or Firm—Richard P. Crowley

[57] ABSTRACT

An adjustable computer system stand adapted to support in a generally vertical direction for positioning a computer system, which stand comprises identical first and second molded plastic sections, each section having a base and generally vertically extending supports at the one and other end of the base, having generally horizontally inwardly extending legs, with the legs having a clip at the end thereof, a clip designed to engage in a snap-in relationship with the corrugation of the opposing leg to permit a user to provide for an adjustable-width computer stand formed into the first and second sections.

14 Claims, 5 Drawing Sheets

ADJUSTABLE COMPUTER SYSTEM STAND

BACKGROUND OF THE INVENTION

It is often desirable to hold and support a computer system such as, but not limited to, computer systems containing computer disc drives, in a generally vertical upright manner in order to reduce floor or table space which may be taken by the computer system if placed in a horizontal position. Such computer systems are generally arranged in a rectangular-type compartment and are placed adjacent to the desk which employs a computer monitor or keyboard and is placed on either the desk surface or the floor adjacent to the desk.

One computer system stand is disclosed in U.S. Pat. No. Des. 287,365 issued Dec. 23, 1986, which stand is nonadjustable in width and designed to accept and vertically hold a generally standard computer system. Other adjustable computer system stands are available, such as the Curtis ® Universal system stands (Curtis ® is a registered trademark of Curtis Manufacturing Company, Inc., of Jaffrey, N.H.). The Curtis ® Universal system stand comprises a pair of identical plastic molded sections which are designed to be secured together in an interlocking manner in order to provide for an adjustable width between a pair of upright supports on each section to accommodate vertically a variety of computer systems, typically with the width adjustment of the stand ranging from about 4 to 7½".

It is desirable to provide for a new and improved, inexpensive, easily adjustable computer system stand.

SUMMARY OF THE INVENTION

The invention relates to an adjustable-width computer system stand to support a computer system in a generally vertical position.

An adjustable computer system stand and method has been discovered to provide an adjustable-width stand to support in a generally vertical direction a computer system, such as a computer disk drive, within the stand. The stand is usually manufactured of molded plastic and comprises two identical sections which are designed to interlock together to form the adjustable-width computer system stand through the employment of a combination of generally vertical corrugation means on horizontally-extending legs of the section, and a clip means designed to clip on to the generally vertical corrugation means on horizontally extending legs of the section to provide for the interlocking together of the identical plastic molded section, in an adjustable-width, secure manner to form a stand of the desired width.

The adjustable computer system stand of the invention comprises a first and second section, with each section being identical and formed of an injection-molded plastic and having an elongated base, which optionally may have a rounded top surface with a portion of the surface a non-slip surface to prevent movement of the computer stand, and having a one and the other end. Each section contains a spaced apart, generally vertically extending support at the one and the other end of the base to provide upright support for the computer system which is to be placed within the interlocked first and second sections which make up the computer system stand of the invention.

Normally, the supports may actually include a straight, upwardly extending surface on the inward portion of each section and may be suitably curved for design, ornamental or strength purposes on the outer sections. Each section also includes spaced apart, generally horizontal-inwardly extending legs, each leg having sides, and typically each leg formed of a U-channel, injected-molded plastic and having a one and another end at one and the other end of the base. The identical sections, when interlocked, have at least two legs in each pair of first and second sections, having a plurality of generally vertical corrugation means extending along all or at least a portion of the sides of the legs, and at least two legs in each pair of the first and second sections having clip means thereon to permit the clip means to engage in a snug, snap-in secure relationship with the corrugation means of an opposing leg of an opposing section to provide for securing together of the first and second sections in an adjustable, removable interlocking manner to form a computer system stand of desired width which is to receive and support a computer system.

In one illustrated embodiment, the legs extending from the base are of unequal length, with the leg of the longer one containing on both sides thereof the corrugation means, while the opposite leg being of shorter length containing the clip means. The leg containing the clip means generally has tongue-like sections, with the clip means generally vertically arranged at the end of the legs at each side of the ends so as to encompass and clip on to the corrugated means on either side of the opposing leg, into which it is engaged in an interlocking relationship. In this embodiment, the legs are arranged such that the leg containing the clip means fits over in a tight, secured, snug fashion the leg containing the corrugation means, with the clip means snapped into the corrugation means on the exterior surface of the legs.

In use, identical plastic molded first and second sections are aligned with the horizontally extended legs in a clip means and are placed over the opposing legs of the opposite's identical sections containing the corrugation means, and slid downwardly to provide for the desired width of the uprised extending support to provide support for the generally vertical computer system. The first and second identical sections are typically injection-molded of a hard, molding type plastic and are molded with an interior surface which typically mimics the exterior surface of the sections, which permits these sections to be stacked with the exterior surface of one section fitting snugly in a 50% or more relationship within the interior section of the overhead section. This vertical stacked arrangement provides for a compact shipping, display and storage arrangement for the pair of identical first and second sections which make up the computer system stand of the invention, so as to reduce the shipping cost and display space. Typically, such vertically stacked identical sections may also be wrapped with a paper or other plastic wrapping with advertising or assembly instructions for use by the potential customer. Thus the adjustable width computer system stand of the invention provides for an inexpensive, easily manufactured, adjustable-width pair of identical plastic molded sections, which may be vertically stacked prior to use to save shipping and display space, and easily assembled to provide for an adjustable-width computer stand.

The invention will be described for the purposes of illustration only in connection with certain embodiments; however, it is recognized that those persons skilled in the art may make various modifications, changes, improvements and additions to the illustrated embodiments without departing from the spirit or scope of the invention.

BRIEF DESCRIPTION OF THE DRAWINGS

FIG. 4 is a side plan view of the computer system stand of FIG. 1 with the other side being similar.

FIG. 5 is an end plan view of the computer system stand of FIG. 1 with the other end being similar.

DESCRIPTION OF THE EMBODIMENTS

Figure 1:
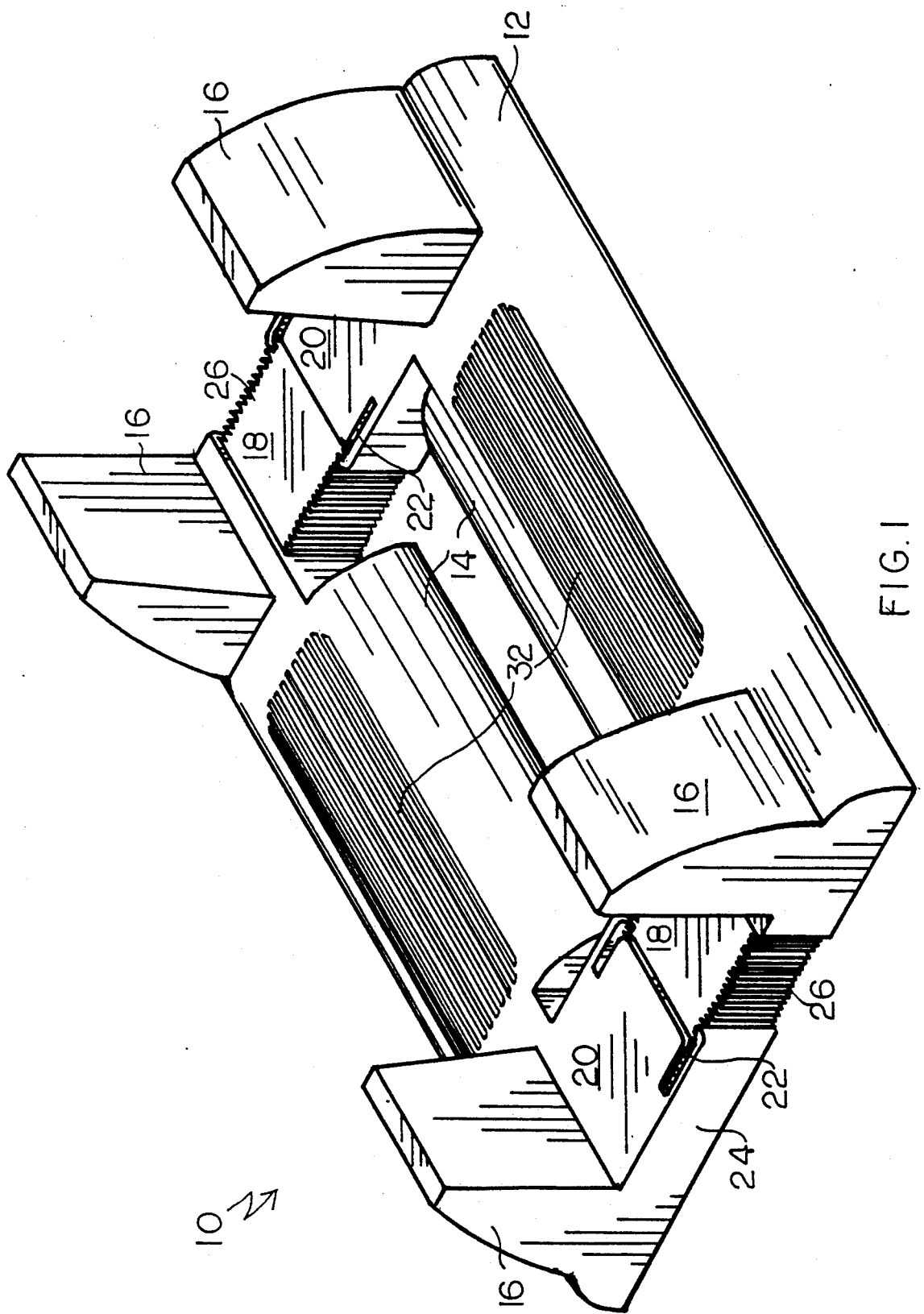
FIG. 1 is a perspective view from above of the computer system stand of the invention.
Figure 2:
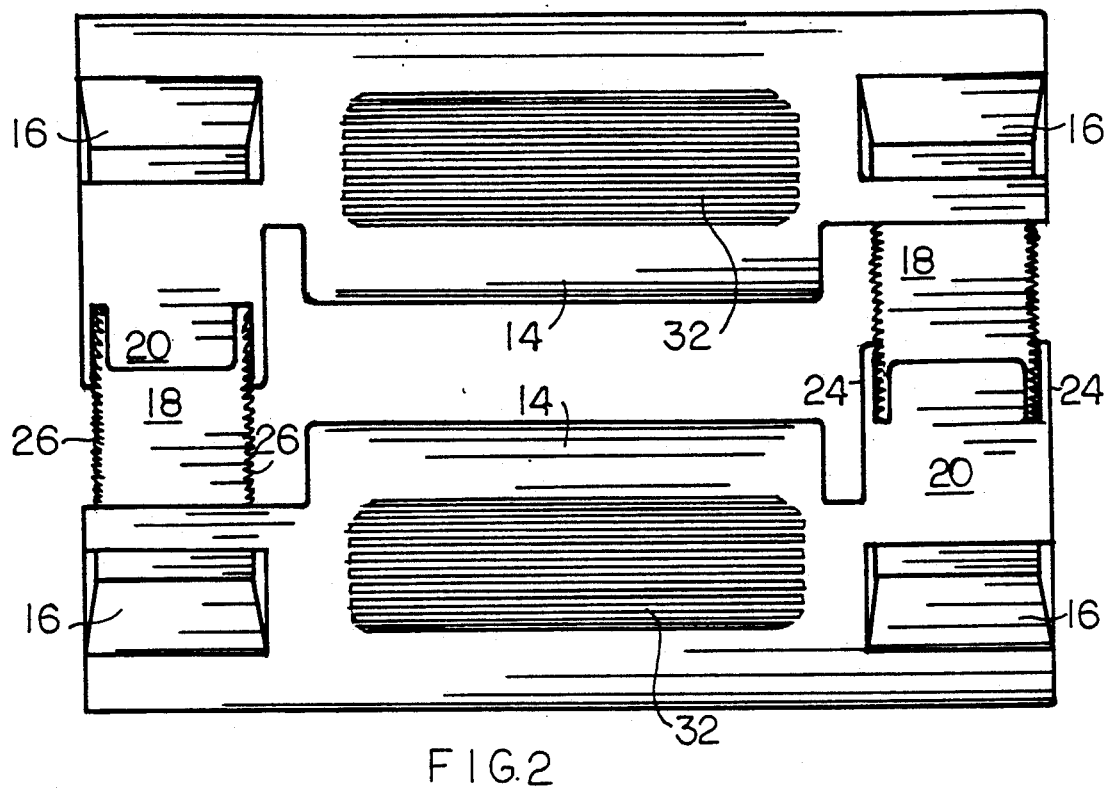
FIG. 2 is a top plan view of the computer system stand of FIG. 1.
Figure 3:
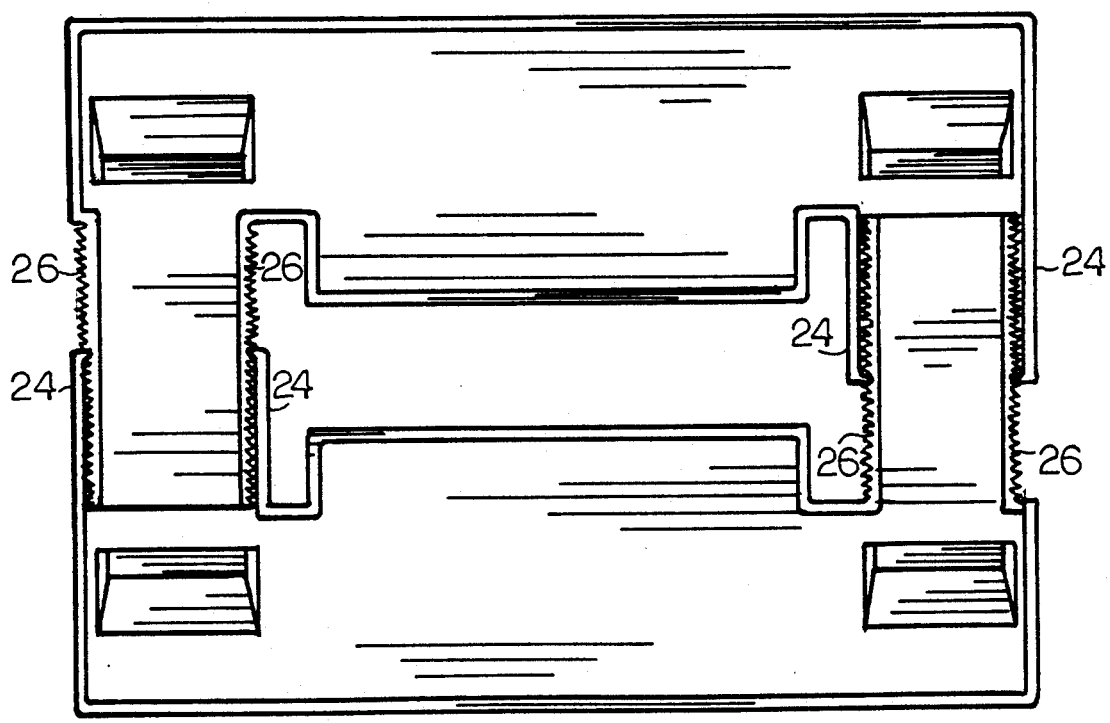
FIG. 3 is a bottom plan view of the computer system stand of FIG. 1.
Figure 4:
Figure 5:
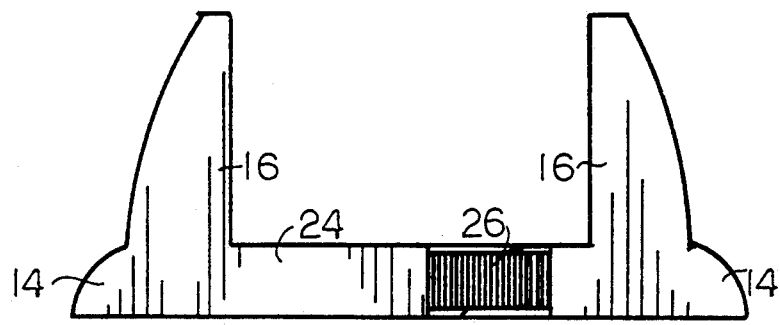
Figure 7:
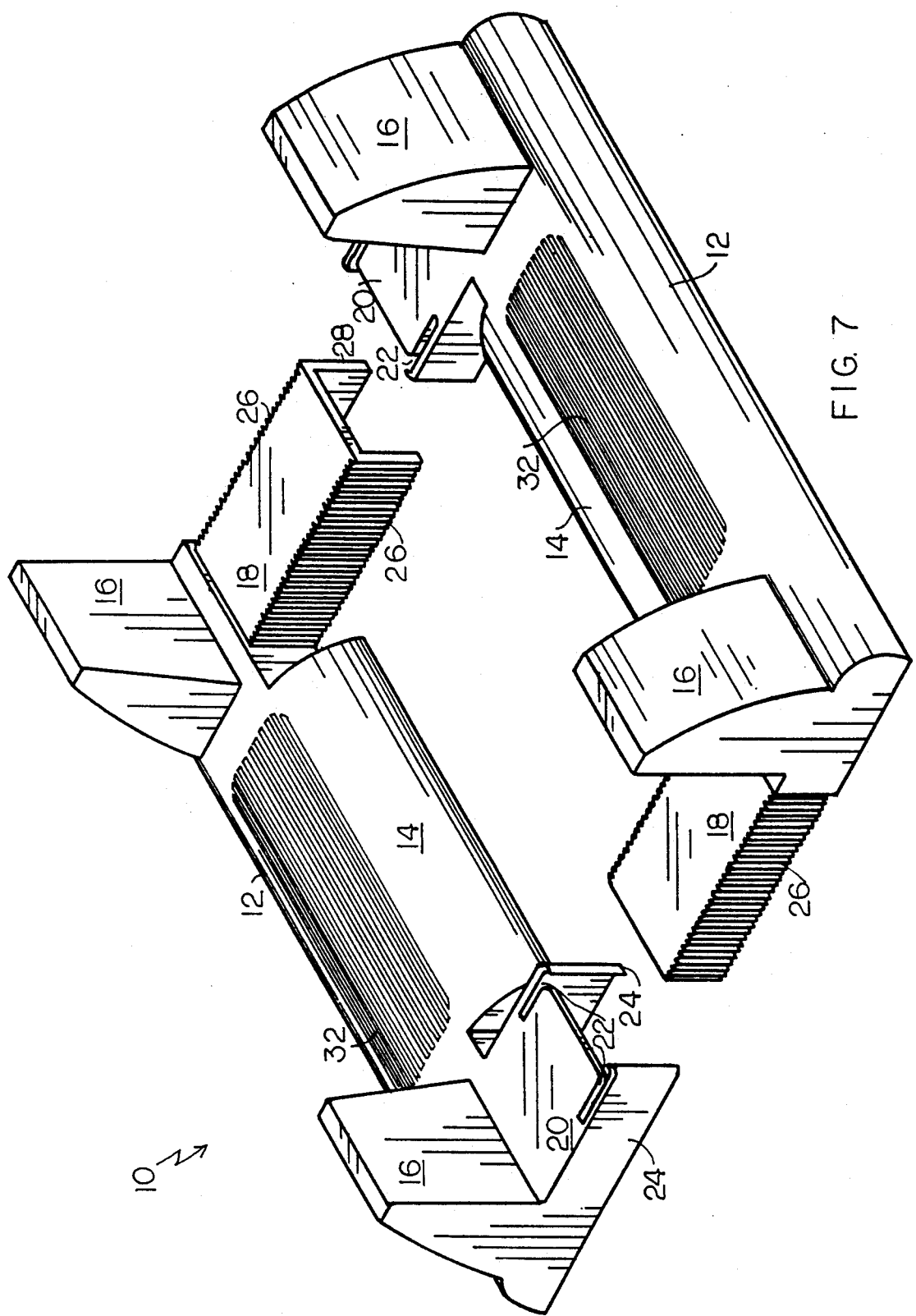
FIG. 7 is a perspective view from above of a pair of first and second sections showing an exploded arrangement prior to assembly to form the computer stand of FIG. 1.
Figure 8:
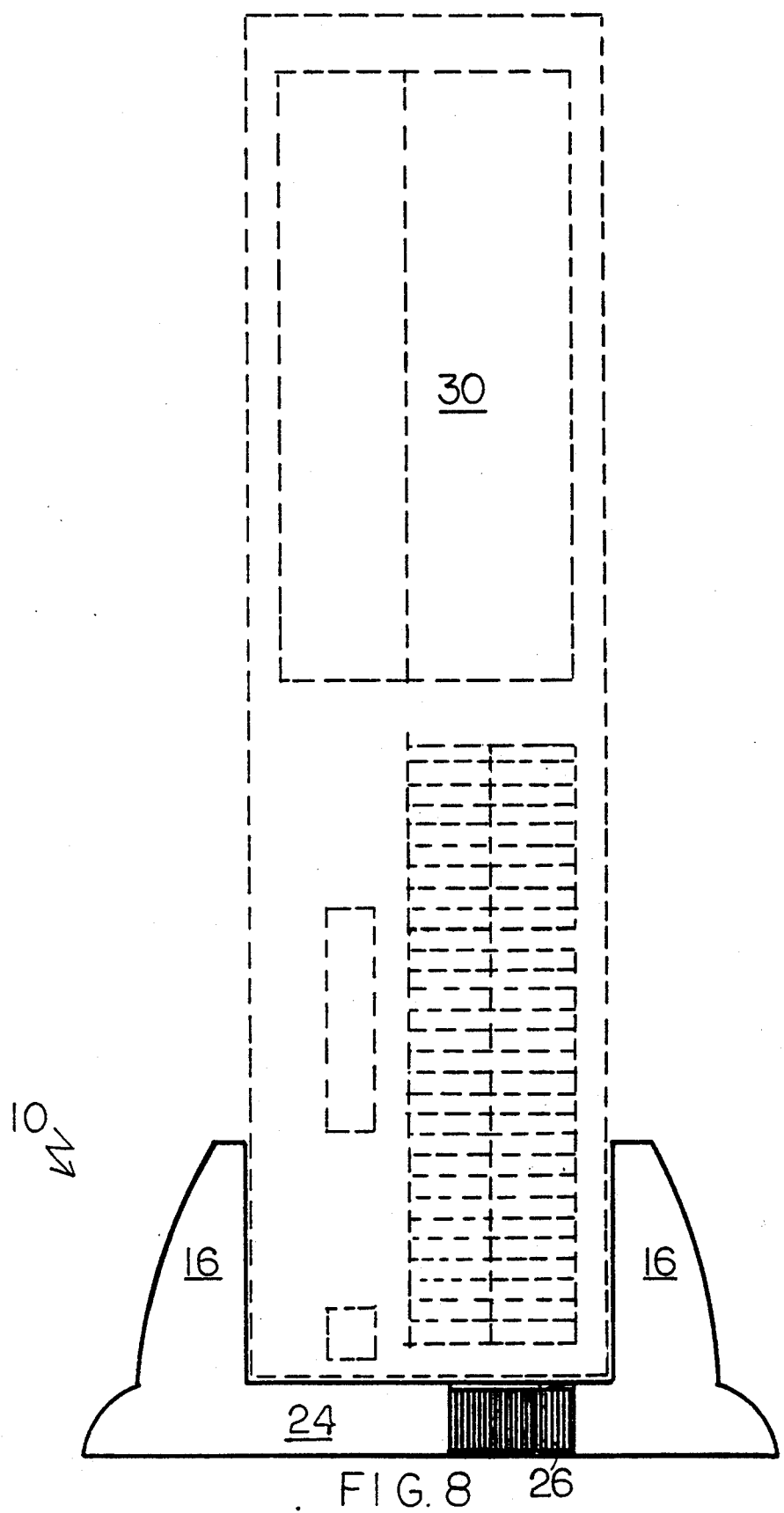
FIG. 8 is a front view of the computer stand of FIG. 1 with a computer system shown in dotted lines supported within the stand.

With reference to the drawing, there is shown a computer system stand 10 of the invention which includes therein a generally upright computer system 30 held within the stand (FIG. 8). The computer system stand 10 comprises two identical, injection-molded, hard plastic sections 12 containing a base 14 with a rounded top surface 32 and with striations on the surface to provide a design and also a friction type surface for containing the computer system 30 in position within the stand 10. The base includes two generally upright supports 16 at each end of the base 14 into the base of the support 16, being generally straight and smooth, extending therefrom U-shaped channel legs 18 and 20, with leg 18 containing a plurality of equally spaced-apart, vertical ridges and grooves, that is corrugations, on both sides of the legs 18 and having an open channel 28 at the open end of the one leg 18. The other leg 20 includes a pair of spaced-apart, generally parallel slots 22 which form a tongue section at the end of the leg 20, and the leg 20 having at the open end thereof a pair of generally vertical, extending inwardly inward projections to form flexible, inwardly biased clip elements which are designed to clip into the grooves on the vertical corrugations 26 of leg 18. The first and second sections are aligned as shown in FIG. 7, and then assembled together as shown in FIG. 1 to form the computer stand 10 of the invention.

In use, the identical sections 12 are horizontally aligned with each leg 18 opposing each leg 20 of the opposite sections, and then leg 20 is snapped in place opposing leg 18, so that the side clips 24 engage in an interlocking snap-in relationship with the vertical corrugations 26 in the opposing leg. FIG. 7 shows the sections 12 aligned and prior to assembly while FIG. 1 shows the assembled, adjustable-width computer stand of the invention.

Figure 6:
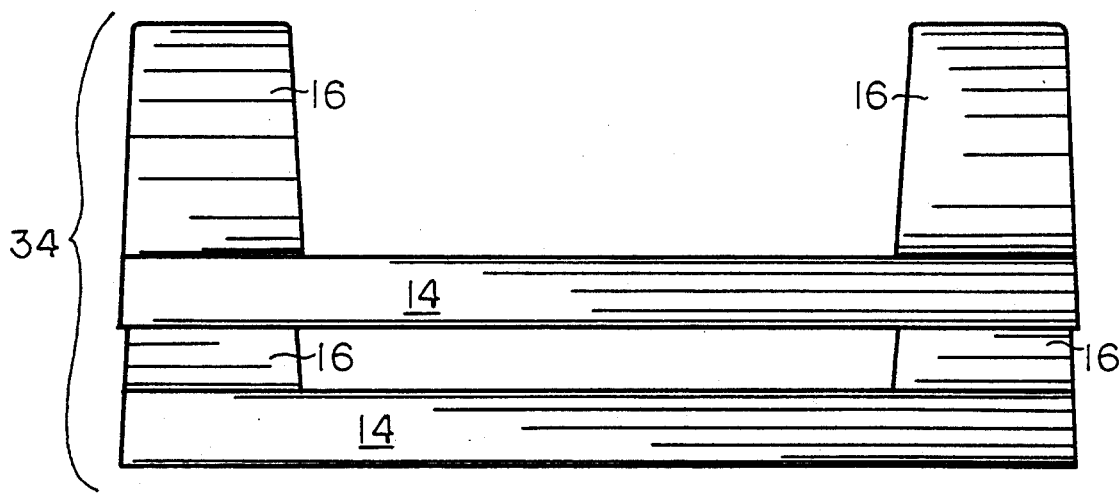
FIG. 6 is a side plan view of a pair of identical first and second sections of the computer stand of the invention in a vertically stacked, compact, shipping, storage and display arrangement.

FIG. 6 shows the identical injected-molded sections 12 arranged in a vertically stacked manner, with the lower section 12 stacked within the interior of the upper selection 12 to provide for a compact display, storage and shipping arrangement 34 for the sections prior to assembly into the computer stand.

If desired, a plurality of pairs of sections 12 may be stacked in a compact stacked relationship, with each pair of sections suitably secured together by plastic or paper wrapping for selection by a customer from the stack.

The invention describes a new and improved, single adjustable-width computer system stand.

What is claimed is:

1. An adjustable computer system stand adaptable to support in a generally vertical direction a computer system, which stand comprises:
    a) a first and second section, each section having
        i) an elongated base having one and the other end;
        ii) spaced-apart, generally vertically extending supports at one and the other end of the base to provide supports for a computer system to be supported within the stand;
        iii) spaced-apart generally inwardly extending legs, each leg having sides thereon at the one and the other end of the base;
        iv) one leg in each pair of first and second sections having corrugation means; and
        v) one leg in each pair of first and second sections having clip means to permit the clip means to engage in an interlocking relationship with the corrugation means of an opposing leg to provide for the interlocking together of the first and second sections to form a computer system stand of desired width to receive and support a computer system.

2. The stand of claim 1 wherein the legs are of unequal length.

3. The stand of claim 1 wherein the corrugation means in the one leg comprise a pluality of generally vertical corrugations extending along the sides of the leg.

4. The stand of claim 1 wherein the leg comprises open U-channel shaped legs, one leg adapted to overlap the opposite leg of an opposite section.

5. The stand of claim 1 wherein the clip means are generally vertical, inwardly extending projections on each side at the end of the leg.

6. The stand of claim 1 wherein the base has a top surface with a non-slip surface thereon.

7. The stand of claim 1 wherein the leg having the clip means contains a top surface with an extending tongue between a pair of generally vertical, inwardly-extending projections along each side at the end of each leg to provide for flexibly moving the clip means to engage the corrugation means of the opposing leg.

8. The stand of claim 1 which comprises identical sections composed entirely of an injection-molded plastic material.

9. The stand of claim 1 wherein the first and second sections are composed of an injection-molded plastic and the sections are characterized by an interior hollow section which substantially mimics the exterior surface of each of the sections to permit the first and second sections to be matingly fit one over the other in a compact, vertically stacked arrangement.

10. The stand of claim 9 wherein the first and second sections are in a compact, vertically stacked arrangement.

11. In combination, the stand of claim 1 and a computer system supported generally vertically within the stand.

12. An adjustable computer system stand adapted to support in a vertical arrangement a computer system, which stand comprises:
 a) first and second identical sections composed of an injection-molded plastic material, each section having an elongated base having a one and the other end;
 b) spaced apart, generally vertically extending supports at one and the other end of the base to provide support for a computer system;
 c) spaced apart, generally horizontally inwardly extending legs, each leg having sides at the one and the other end of the base; and
 d) each section having a leg containing a plurality of generally vertically corrugation means extending vertically along both sides of the leg, and each section having a leg containing a clip means comprising inwardly extending projections at the end of the leg with the leg containing the corrugation means generally of greater length than the leg having the clip means, and the clip means designed to engage in a snap-in relationship with the corrugation means of the opposing leg of the opposing section to provide for the snap-in relationship together of the first and second sections to form a computer system stand with the leg having clip means extending over the opposing leg with the corrugation means to form an adjustable-width computer system stand.

13. In combination, the stand of claim 12 and a computer system supported in a generally vertical position within the stand.

14. In combination, at least one pair of first and second sections of claim 12 in a vertically stacked arrangement.

* * * * *